United States Patent [19]

Miyawaki

[11] Patent Number: 4,745,444
[45] Date of Patent: May 17, 1988

[54] DEVICE FOR LOADING PAPER MASK ON PHOTOGRAPHIC PRINTER

[75] Inventor: Hiroshi Miyawaki, Wakayama, Japan

[73] Assignee: Noritsu Kenkyu Center Co., Ltd., Wakayama, Japan

[21] Appl. No.: 42,098

[22] Filed: Apr. 23, 1987

[30] Foreign Application Priority Data

Apr. 25, 1986 [JP] Japan ............ 61-63802[U]
Aug. 11, 1986 [JP] Japan ........... 61-123579[U]

[51] Int. Cl.⁴ .................................................. G03B 27/58
[52] U.S. Cl. ............................................................. 355/74
[58] Field of Search ....................................... 355/72, 74

[56] References Cited

U.S. PATENT DOCUMENTS

| 3,470,644 | 10/1969 | Craig | 355/74 |
| 3,689,149 | 9/1972 | Livingood | 355/74 |
| 4,234,251 | 11/1980 | Nishida et al. | 355/74 |
| 4,240,744 | 12/1980 | Rapp et al. | 355/74 |
| 4,701,046 | 10/1987 | Shiga | 355/74 |

Primary Examiner—Monroe H. Hayes
Attorney, Agent, or Firm—Wenderoth, Lind & Ponack

[57] ABSTRACT

An improved arrangement is proposed for loading a paper mask on a photographic printer under a printing paper without fear of hitting the edge of printing paper and damaging it. One edge of the paper mask hits a part of the rocking body, pivoting it. This springs up the working plate and the push plate into their operative position. The front end of the push plate pushes up one edge of the printing paper. This facilitates the insertion of a paper mask under the printing paper. When an opening formed in the paper mask comes over the rocking body, the working plate and the push plate return to their inoperative position under gravity.

3 Claims, 4 Drawing Sheets

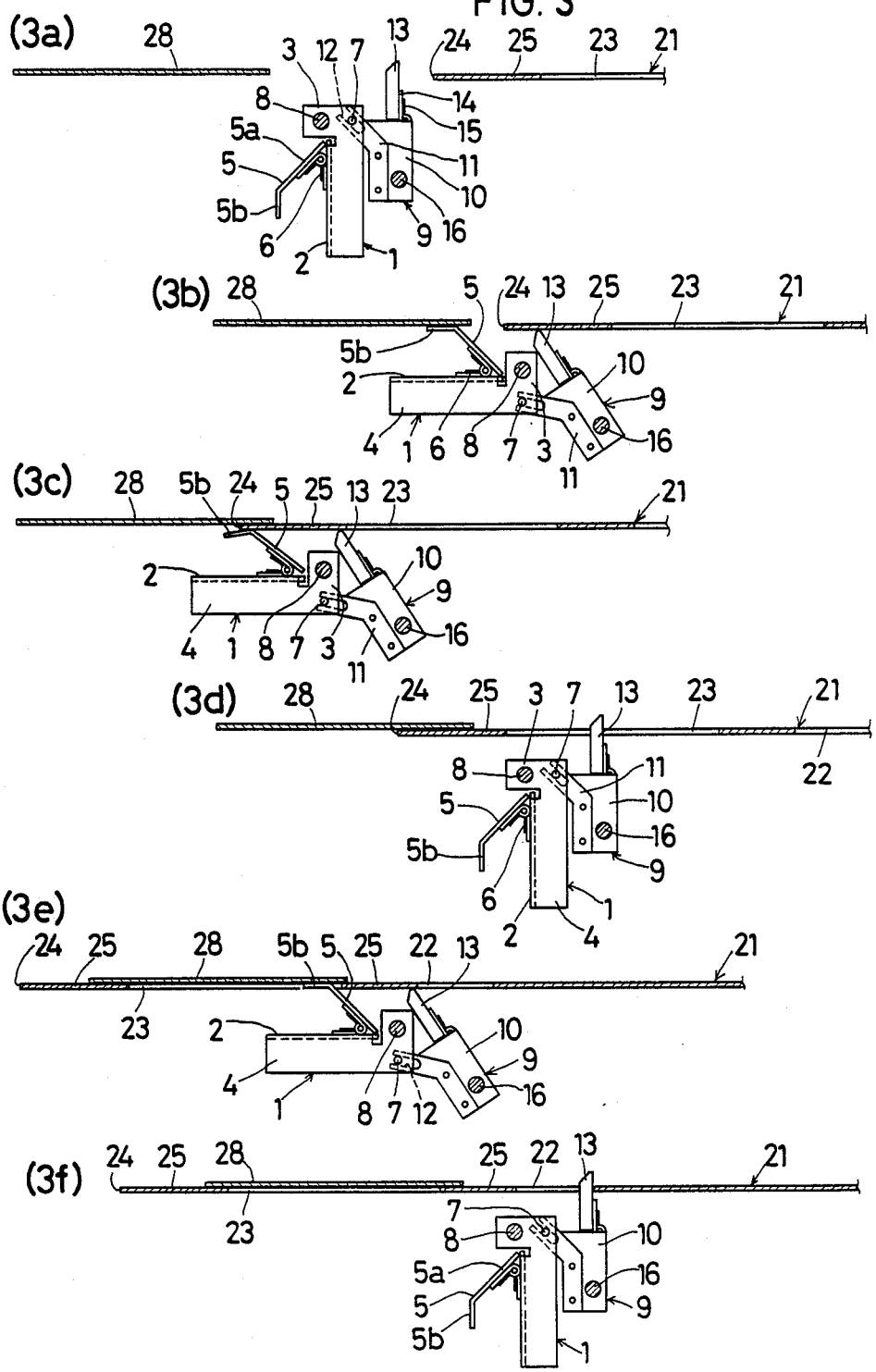

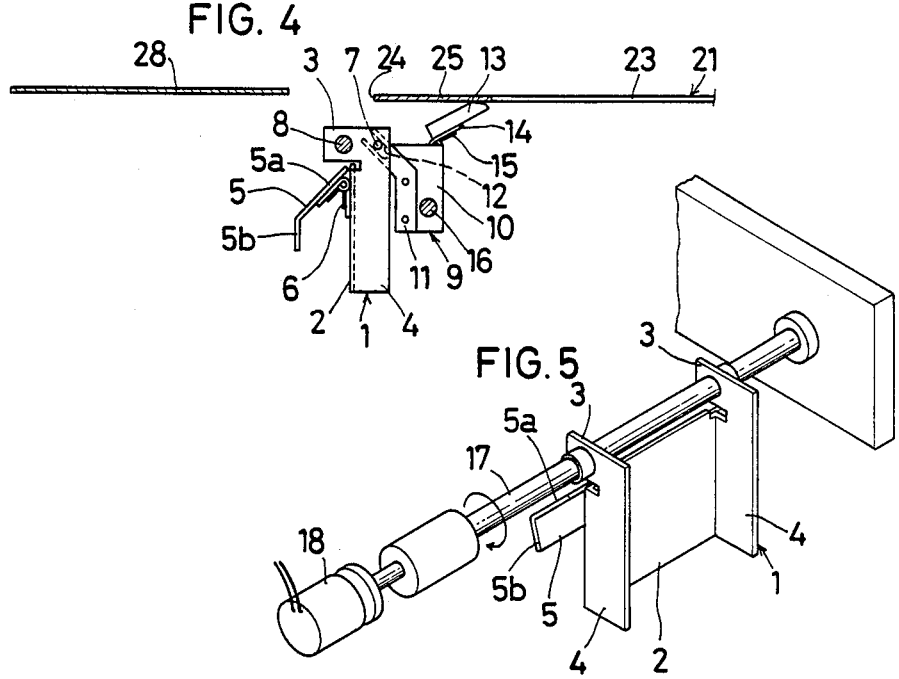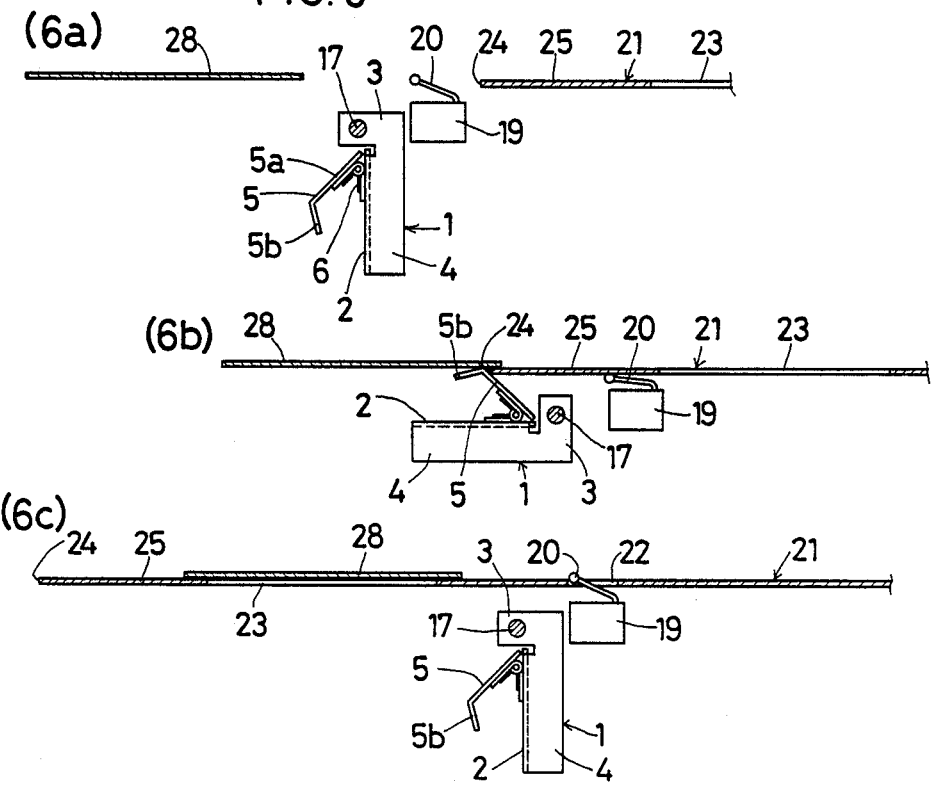

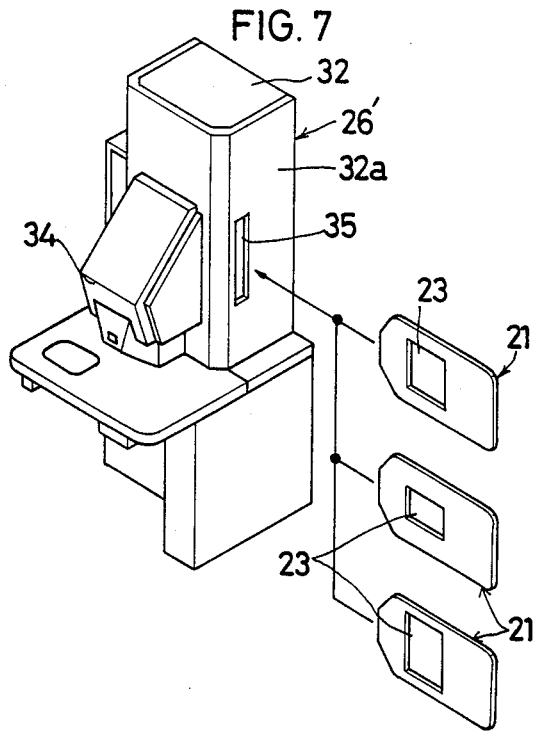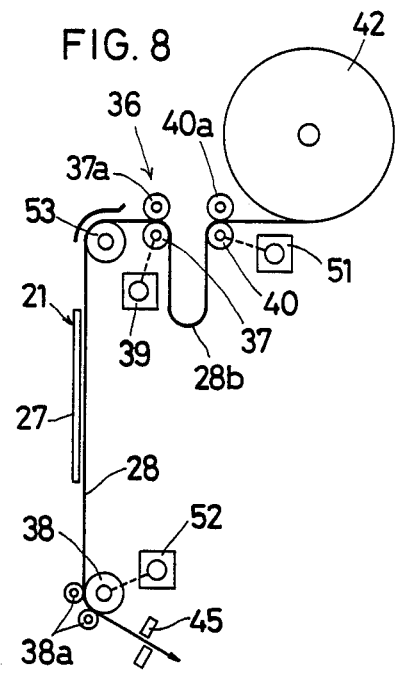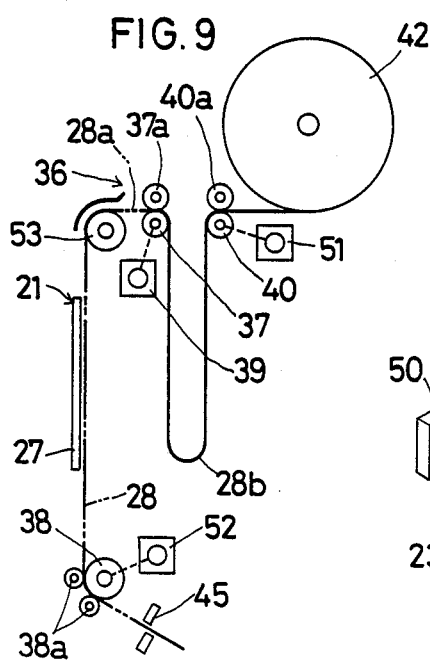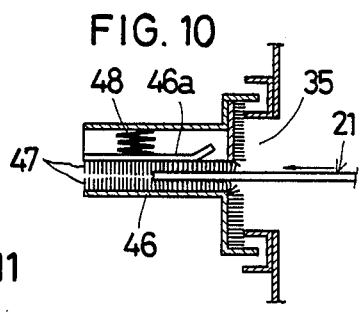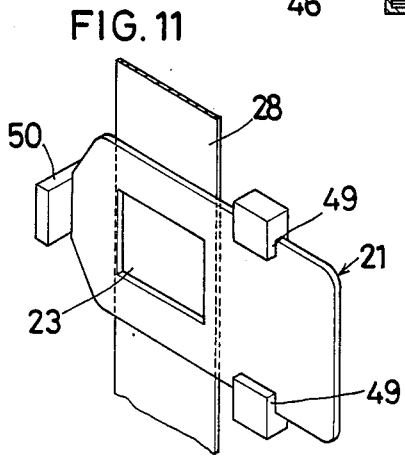

DEVICE FOR LOADING PAPER MASK ON PHOTOGRAPHIC PRINTER

The present invention relates to a device for loading a paper mask on a photographic printer or a recently developed printer/processor including both a printer and a paper processor, and more particularly to a device for inserting a paper mask under a web of photographic printing paper at a right angle to the direction of movement of the web.

When printing a web of printing paper in a printing unit of a photographic printer, a paper mask having a desired size is selected from paper masks formed with openings for light exposure of various sizes, and inserted into the printing unit under the printing paper. The printing paper is then subjected to light exposure. When inserting the paper mask, it is the easiest way and preferable to insert it from the direction normal to the movement of the printing paper, considering the mechanism of a conventional printer. But, since the web of printing paper tends to be not straight but wavy owing to looseness, the paper mask inserted from such a direction is likely to hit the edge of the printing paper, thus scratching or damaging it. The damage to the emulsion coated surface will have a bad effect on the finish of the print. Further, the paper mask might not be inserted or set in a right position, hindered by the edge of the printing paper.

Various improvements have been proposed to cope with the abovesaid problems, including the provision of a device in which a paper mask is inserted along the direction of movement of a printing paper. But none of them were satisfactory owing to the complexity of an inserting mechanism.

An object of the present invention is to provide a device for loading a paper mask into a printing unit of a photographic printer which obviates the abovesaid short-comings. One longitudinal edge of the printing paper is pushed up automatically and simultaneously with the insertion of the paper mask to allow the paper mask to be readily inserted under the printing paper without damaging its emulsion coated surface. Upon completion of insertion, upward pressure on the printing paper is removed to allow it to be lowered into close contact with the paper mask.

In accordance with the present invention, there is provided a device for loading a paper mask on a photographic printer having a printing unit, comprising a working unit pivotally mounted to be movable toward and away from one longitudinal edge of a web of photographic printing paper loaded in the printing unit, a push plate elastically mounted on the working unit for pushing up the printing paper along the edge from which the paper mask is inserted, and a controller actuated by an edge portion of the paper mask to move the working unit to its operative position and adapted to permit the working unit to get back to its inoperative position when a cutout portion of the paper mask is passing over the controller.

From another aspect of the present invention, the printing paper is removed from the printing unit before inserting a paper mask and then the paper mask can be readily inserted into the space thus made by the removal of the printing paper without the fear of damaging the surface of the printing paper.

Other features and objects of the present invention will become apparent from the following description taken with reference to the accompanying drawings, in which.

Figure 1:
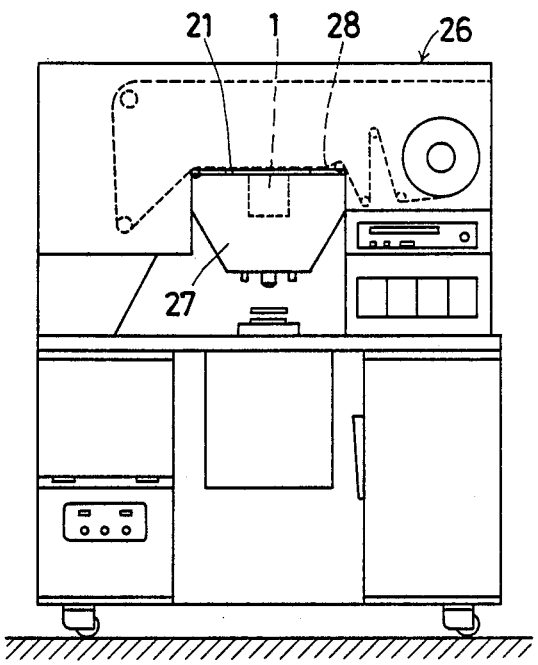
FIG. 1 is a front view of a printer provided with a device in accordance with the present invention.
Figure 2:
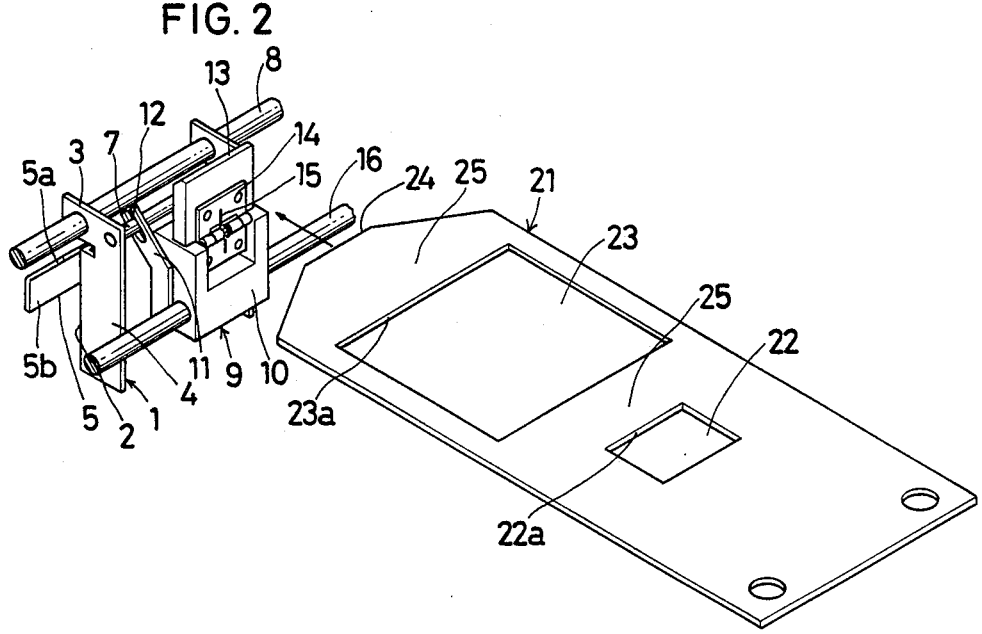
FIG. 2 is a perspective view of a paper mask loading unit.

FIGS. 3(a)–3(f) are partially cutaway side views showing how the paper mask is inserted;

FIG. 4 is another side view of the loading unit showing how a paper mask is pulled out;

FIG. 5 is a perspective view of a loading unit showing another embodiment;

FIGS. 6(a)–6(c) are partially cutaway side views of the loading unit showing how the paper mask is inserted in the other embodiment;

FIG. 7 is a perspective view of a printer in a further embodiment;

FIG. 8 is a schematic view of the same showing how the web of printing paper is fed;

FIG. 9 is a similar schematic view of the same showing how the web of printing paper is fed back to replace the paper mask;

FIG. 10 is a horizontal sectional plan view of the slot for insertion of the paper mask showing how light is schielded; and FIG. 11 is a perspective view showing the paper mask inserted.

In the drawings, numeral 1 designates a working unit comprising a working plate 2 formed with a rearwardly bent rib portion 4 at each side thereof. Each rib portion 4 is formed at its top with a supporting portion 3 having a larger width. A resilient push plate 5 formed with a crooked lower portion 5b is pivotally mounted at its upper edge 5a on the upper part of the working surface of the working plate 2 through a torsion coil spring 6 so as to form an angle of about 45 degrees with respect to the working plate 2. The lower edge 5b of the push plate 5 is pushed toward the working plate against the bias of the spring 6 when an external force is applied.

In mounting the working unit 1 in a printing unit 27 of a printer 26 loaded with a web of photographic printing paper, it is mounted in an area adjacent to and under the longitudinal edge of the printing paper on the side from which a paper mask 21 is to be inserted. The working plate 2 is pivotably mounted on an upper shaft 8 at the protruding portions of its supporting portions 3 while being backed up by a working pin 7 so as to allow the working plate 2 to spring up to a level parallel to the surface of the printing paper 28.

A rocking body 10 of a controller 9 located behind the working unit 1 is pivotally mounted on a lower shaft 16 extending in parallel with the upper shaft 8. On both sides of the rocking body 10 are mounted control arms 11 formed at their tip with engaging slits 12 extending obliquely upward so as to engage the working pin 7. By a forward rocking motion of the rocking body 10 about the lower shaft 16, the working pin 7 of the working plate 2 engaging the control arms 11 is forced down in a lever-like fashion so that the working plate 2 will spring up forward to a horizontal state. A butt plate 13 is mounted on the top of the rocking body 10 by means of a hinge 14 so as to be bendable rearward only. The butt plate 13 kept upright by a torsion coil spring 15 is so arranged as to stand normal to the direction of movement of a paper mask 21 in the way of the paper mask as shown in FIG. 3(a).

As shown in FIG. 3(b), a tip 24 of the paper mask 21 pushes the butt plate 13 while proceeding, causing the rocking body 10 to swing forward around the shaft 16, thus forcing down the working pin 7 of the working plate 2 by means of the control arm 11. The lower end of the working plate 2 will spring up around the shaft 8 to a level parallel with the surface of the printing paper 28. In this state, the lower portion 5b of the resilient push plate 5 on the working surface pushes up the side edge portion of the printing paper 28. The paper mask 21 is then inserted into the underside of the printing paper 28, pushing down the push plate 5 against the bias of the coil spring 6, as shown in FIGS. 3(c), 3(d), 3(e) and 3(f).

As shown in FIGS. 3(b), 3(c) and 3(e), the working plate 2 keeps its horizontal position while the head of the butt plate 13 is being pressed down by an edge frame 25 of the paper mask 21. As shown in FIGS. 3(d) and 3(f), when cutout portions such as an opening 23 for light exposure or an aperture 22 formed in the paper mask 21 are passing over the butt plate 13, the downward pressure on the top of the butt plate 13 is removed, allowing the working plate 2 to swing back to its upright position under gravity, and releasing the upward pressure on the printing paper 28. Thus, the printing paper is brought into close contact with the surface of the edge frame 25 of the completely inserted paper mask 21 and subjected to light exposure. The controller 9 is also swung back to its upright position together with the working plate 2. For replacing the paper mask 21, it can be pulled out without any resistance by hooking the edge 22a of the aperture 22 and then the edge 23a of the opening 23 to the butt plate 13 of the controller 9 standing upright to force down the butt plate 13 as shown in FIG. 4. The printing paper 28 thus exposed to light is sent to a processing unit (not shown) provided in the printer 26 to undergo development, drying and cutting.

FIGS. 5 and 6 show another embodiment in which the supporting portions 3 of the working plate 2 of the working unit 1 is fixedly mounted on a rotary shaft 17 extending parallel with the printing paper. The rotary shaft 17 electrically rotated by a rotary solenoid 18 springs up the working plate 2 to a level parallel with the printing paper 28. As a controller, a limit switch 19 is connected to the rotary solenoid 18. When inserting the paper mask 21, its tip 24 and edge frame 25 press down a control lever 20 to actuate the rotary solenoid 18, rotating the rotary shaft 17, so that the working plate 2 springs up as shown in FIG. 6(b). As shown in FIG. 6(c), upon completion of the insertion, the downward pressure on the control lever 20 is removed at the cutout portions formed in the paper mask 21, that is, the opening 23 for light exposure and the aperture 22, deenergizing the rotary solenoid 18, and thus allowing the working plate 2 to get back to its upright position under gravity. The edge portion of the printing paper 28 is freed from the upward pressure from the push plate 5 and allowed to be lowered into close contact with the paper mask 21 for exposure. When replacing the paper mask 21, it can be easily pulled out by hooking the edge 22a of the aperture 22 and the edge 23a of the opening 23 of the paper mask to the control lever 20 and by forcing it down. The work of pulling out the paper mask 21 in this manner is feasible in spite of the fact that the control lever 20 of the limit switch 19 is depressed by the edge frame 25 of the paper mask 21 and accordingly the working plate 2 is brought to a raised position by the solenoid 18.

If the push plate 5 employed in the present invention is of a resilient material such as a steel sheet, then the spring 6 may be omitted.

Next, referring to FIGS. 7 and 8, a printer 26' comprises a printing box 32 provided with a carrier system 36 and a light source box 34 provided with a negative support unit. The righthand wall 32a of the printing box 32 in FIG. 7 is formed with a slot 35 for inserting paper masks 21 formed with openings 23 of various sizes for light exposure.

As shown in FIG. 8, in the printing box 32, a web of photographic printing paper 28 is pulled out from a reel 42, fed by a feed roller 40 driven by a motor 51, a driving roller 37 driven by a reversible motor 39 and a feed roller 38 driven by a motor 52 so as to run along the paper mask 21 that has been inserted into the printing unit 27 through the slot 35 and is subjected to light exposure. Numerals 37a, 38a and 40a represent press rollers. Numeral 53 does a free roller.

When replacing the paper mask 21 for a change of the print size, the printing paper 28 is cut by a cutter 45 and rewound by a reversal operation or by rotating the driving roller 37 and the feed roller 38 in reverse by the motor 39 linked to the drawing operation of the paper mask 21. When an end portion 28a (FIG. 9) comes to the area just ahead the driving roller 37, a photo sensor (not shown) for sensing the position of the end portion automatically stops the reverse rotation of the motor 39. The printing paper 28 thus rewound is hung in a loop 28b between the feed roller 40 and the driving roller 37. In the absence of the printing paper 28 in the printing unit 27, the paper mask 21 can be readily replaced with a new one. After setting the new paper mask, the motor 39 is rotated forward to rotate the driving roller 37 and the feed roller 38, thus feeding the printing paper hanging in the loop 28b to the printing unit 27. The printing paper extending along the paper mask 21 is subjected to light exposure in such a state as shown in FIG. 8.

As shown in FIG. 10, a light shield system provided for the slit 35 comprises a pair of opposing light shield plates 46 and 46a. The light shield plate 46a on one side of the slot 35 is pressed against the other one 46 by means of a spring 48 so as to be movable toward and away from the light shield plate 46. The light shield plates are planted with flocks 47 on the surfaces opposite to each other for shielding light. The paper mask 21 inserted through the flocks 47 is guided by a pair of upper and lower guide grooves 49 (FIG. 11) provided in the course of insertion of the paper mask and is put in position by a stopper 50.

What is claimed is:

1. A device for loading a paper mask on a photograpic printer having a printing unit, comprising a working unit pivotally mounted to be movable toward and away from one longitudinal edge of a web of photographic printing paper loaded in the printing unit, a push plate elastically mounted on said woking unit for pushing up said printing paper along the edge from which said paper mask is inserted, and a controller actuated by an edge portion of said paper mask to move said working unit to its operative position and adapted to permit said working unit to get back to its inoperative position when a cutout portion of said paper mask is passing over said controller.

2. A device for loading a paper mask on a photographic printer as claimed in claim 1, wherein said working unit is pivotally mounted on a first shaft, said controller comprises a rocking body located behind said working unit and pivotally mounted on a second shaft extending in parallel with said first shaft, control arms mounted on said rocking body extending obliquely forward so as to engage said working unit, and a butt plate pivotally mounted on top of said rocking body so as to be bendable in only one direction.

3. A device for loading a paper mask on a photographic printer as claimed in claim 1, wherein said working unit is fixedly mounted on a rotary shaft adapted to be turned electrically, said controller comprising a switch connected to a control lever actuated by an edge of the paper mask to turn said rotary shaft.

* * * * *